Apr. 17, 1923.
S. W. TAYLOR
TEMPORARY FASTENING
Original Filed Feb. 3, 1920
1,451,970
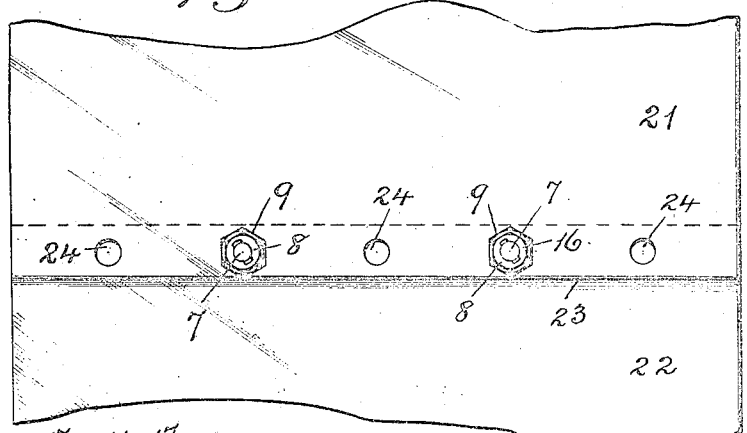
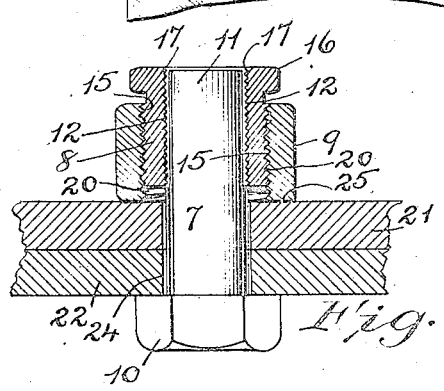
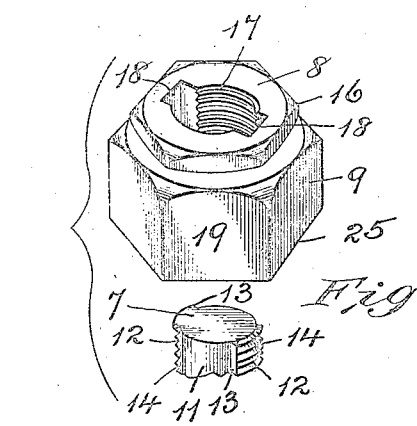
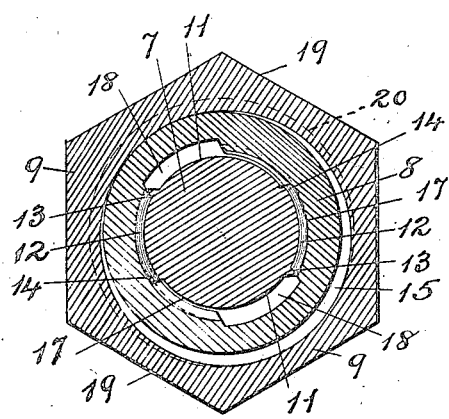
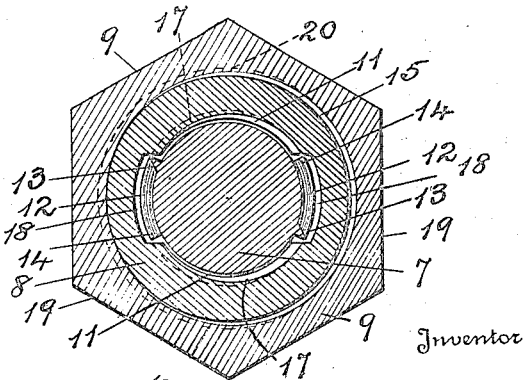
Inventor
Samuel W. Taylor
By
Mann & Co.
Attorneys Patented Apr. 17, 1923.

1,451,970

UNITED STATES PATENT OFFICE.

SAMUEL W. TAYLOR, OF BALTIMORE, MARYLAND, ASSIGNOR TO CONSTANT J. KRYZANOWSKY, OF RUXTON, MARYLAND.

TEMPORARY FASTENING.

Application filed February 3, 1920, Serial No. 355,974. Renewed January 16, 1922. Serial No. 529,743.

*To all whom it may concern:*

Be it known that SAMUEL W. TAYLOR, a citizen of the United States, residing at Baltimore, in the State of Maryland, has invented certain new and useful Improvements in Temporary Fastenings, of which the following is a specification.

This invention relates to an improved fastening comprising a bolt and a nut of such construction as to permit the two parts to be quickly assembled and positioned against the work to be fastened without rotation of one part with respect to the other and then by a partial rotation securely locked in place.

The device is especially adapted as a temporary fastening in structural work, such for example, as in shipyards, bridge work, modern building construction, or in fact in any line of work where metal plates, beams, girders or the like, are to be permanently riveted together.

It is customary to assemble the work and temporarily secure the parts together at intervals by passing bolts through registering perforations that have previously been made in the metallic parts. When the parts have to be drawn close together at spaced intervals by means of the temporary bolts, leaving other perforations exposed for the reception of the permanent rivets, the riveters will set to work, place the rivets in the exposed perforations and permanently hammer them down. After this, the temporary bolts are removed one at a time, and rivets inserted in their stead.

This operation is recognized as good with the exception that considerable time is consumed in placing the temporary bolts in position and screwing the nuts home to draw the parts close together. Then the operation must be reversed to take the nuts off and remove the temporary bolts as the rivets are substituted. There is therefore a double loss of time because of the necessity of screwing the nuts onto the bolts and afterward removing them.

The object therefore of the present invention is to provide an improved construction of temporary fastening wherein the nut may be slid longitudinally onto the bolt and when seated against the work, a partial revolution given the nut to securely lock it onto the bolt, thereby saving the time otherwise necessary in screwing the nut all the way along the bolt from the end forward.

The invention is illustrated in the accompanying drawing, wherein,—

Fig. 1. shows two plates with lapped edges, the lapped joint being provided with spaced-apart perforations and the plates being temporarily secured together by means of my improved fastening.

Fig. 2. illustrates the detachable fastening,—the nut part thereof being in longitudinal section.

Fig. 3. shows an enlarged cross-sectional detail through the bolt and nut with the two parts in position to permit the nut to be moved longitudinally onto or from the bolt without rotation.

Fig. 4. illustrates the same, the parts however being partially rotated to lock the threads of the two parts together, and Fig. 5. shows in perspective, the end of the bolt and the nut slightly separated but in the relative positions they must have to slide the threaded nut-part onto the threaded bolt.

In carrying out my invention I preferably employ a bolt 7; a locking sleeve 8, and a nut 9, the three parts embodying the invention in the preferred form.

The bolt 7, preferably has a head or enlargement 10, at one end thereof, and at the other end, the body of the bolt is provided with smooth longitudinal portions 11, at diametrically-opposite sides which smooth portions extend lengthwise of the bolt from the extreme end thereof.

At two other diametrically opposite sides the body of the bolt is provided with segmental screw-threaded sections 12, which latter are also disposed longitudinally on the bolt-body as clearly shown in the fragment of the bolt-end illustrated in Fig. 5 of the drawing.

It is to be understood that while I have shown two smooth portions on opposite sides of the bolt and two segmental screw-threaded sections at two other diametrically-opposite sides of the same, this feature of the invention resides in the fact that the bolt-body is provided with alternate threaded and smooth longitudinally-extending portions, without regard to the number of each of said portions that may be employed.

An important feature in the bolt structure from a practical point of view resides in the fact that at least one of the segmental threaded sections 12, has a stop wall 13, along one end of its successive threads while the opposite end of each of said threads is open. In other words the threads are so formed that the entering ends 14, thereof are open for the entrance of a thread on an engaging-member but the opposite ends of said threads are closed so as to form a stop and limit the rotating movement of the engaging member.

In the form of bolt shown in the accompanying drawing each segmental threaded section 12, has a stop wall 13, at the far end of its threads and it is to be understood that the engaging member that is to coact with the bolt will only be able to make a partial revolution on the bolt because of the stop walls 13, as will presently be more fully explained.

In connection with the bolt I utilize what may be termed a locking sleeve 8. This sleeve has an exterior circumferential screw-thread 15, which extends from the extreme inner end toward the outer end, and at the outer end, said sleeve is preferably provided with a head 16, that is of an angular outline substantially like a nut.

The interior of the locking sleeve corresponds with the exterior of the bolt in so far as smooth portions and threaded portions are concerned, in that, in the form shown, two opposite sides of the sleeve interior are provided with screw-threads 17, while two other opposite sides 18 are smooth from one end to the other of the sleeve.

By means of this construction of sleeve and bolt it is believed to be obvious, upon referring to Fig. 5, of the drawing, that the sleeve when turned so that its smooth sides 18, will register with the threaded segments 12, of the bolt, and the threaded sides 17, register with the smooth sides 11, of the bolt, that the sleeve may be slipped onto the end of the bolt and moved longitudinally thereon without rotating one with respect to the other, so that instead of revolving the sleeve to advance it on the bolt the same may be moved longitudinally on the bolt without revolution.

After the sleeve has been moved onto the bolt a partial revolution thereof will engage its threads 17, with the threads 12, of the nut, and in accordance with my invention this partial revolution will be sufficient to lock the sleeve and bolt together, as will presently be more fully explained.

Another element employed by me in carrying my invention into practical effect is a nut 9, having angular sides 19, and interior screw-threads 20. The interior of the nut is of such diameter that its screw-threads 20, will engage and travel on the exterior screw-thread 15, of the locking sleeve.

The operation of the structure is as follows:

Presuming that the work to be clamped prior to the permanent riveting is represented by two plates 21 and 22 which are placed together with lapped edges, as at 23, and with registering perforations 24, the bolt 7, is inserted through the registering perforations 24, in the two lapped plates until the head 10, of the bolt is seated against the side of one plate and the opposite end of the bolt projects at the outer side of the other plate. This outer projecting end is that which has the alternate threaded and smooth longitudinal portions 12 and 11 respectively.

The nut 9, is screwed onto the inner end of the sleeve and preferably out to the under side of the sleeve-head 16, as shown in the upper part of Fig. 5, of the drawing.

The nut and sleeve are then turned together until the smooth portions 18, of the sleeve register with the threaded portions 12 of the bolt, and at the same time, the threaded portions 17, of the sleeve will register with the smooth portions 11 of the bolt, also as indicated in Fig. 5, of the drawing.

Having presented the sleeve to the end of the bolt with the parts in register as just explained, the sleeve, carrying the exterior nut may be slipped bodily onto the end of the bolt and moved toward the plates until the inner end 25, of the nut seats against the outer side of the plate, which in this instance will be termed the plate 21.

By then slightly rotating the nut 9, it will at first travel slightly on the sleeve until the nut-end 25, bears hard on the plate, and when this pressure is set up and the nut turned a little further, the sleeve 8, will receive a partial rotation, which movement will engage the threads 17, of the sleeve with the threads 12, on the bolt. When the sleeve threads and the bolt threads engage, which is upon a partial revolution only of the sleeve, the movement is quickly stopped because the entering edges of the sleeve-threads 17, will strike the stop 13, at the ends of the bolt-threads 12, and further rotation between the sleeve and bolt will be impossible.

The nut will then have position between the metal plates and the sleeve which latter has now been locked to the bolt and by using a wrench on the nut 9, the latter may be made to turn more or less on the sleeve, thereby traveling forward on the sleeve, until the plates are securely clamped together.

In practice the operation is very quickly accomplished and much more quickly than could be done if the nut had to be rotated to effect its travel on the bolt; because in most instances one revolution of the nut will be sufficient to secure the plates together.

To remove the bolt a reversal of the nut will at once unlock the sleeve, and both nut and sleeve can be slipped from the bolt, thus again effecting a considerable saving of time in the operation.

Having described my invention, I claim,—

1. In a fastening device the combination with a bolt having a permanent head at one end of its body which latter also has a longitudinally-extending threaded portion and a longitudinally-extending smooth portion both of which portions extend from the end of the body toward the head, of a sleeve having an angular head at one end and its interior provided with longitudinal smooth and threaded portions, said sleeve having a continuous screw-thread around its exterior circumference, and a nut engaging the continuous threads on the exterior of the sleeve and movable on the latter.

2. In a fastening device the combination with a bolt part having a longitudinal threaded portion and a longitudinal smooth portion both portions extending along the bolt-part from the same end thereof, of a sleeve-part having a continuous screw-thread on its exterior and on its interior provided with a threaded portion and a smooth portion both of which latter portions extend all the way through the sleeve-part; means on one of said parts to limit the rotation of one part with respect to the other, and a nut carried on the exterior of the sleeve and movable longitudinally on the latter.

3. In a fastening device the combination with a bolt-part, of a sleeve-part and both of said parts having engageable interrupted threaded portions thereon, the threads on one part being open on the entering ends and closed at the opposite ends whereby to limit the extent of rotation of one part with respect to the other said sleeve part having a continuous external screw-thread, and a nut carried on the said external sleeve-thread.

4. In a fastening device the combination with a bolt member having a head and shank, of a locking member slidable on said shank, said shank formed with means to be engaged by said locking member to hold it in locking engagement with said shank at any desired place along the shank, and clamping means adjustably related to said locking member to clamp the work between the clamping means and the bolt head.

5. In a fastening device, the combination with a bolt member having a head and shank, of a locking member slidable on said shank, said locking member adapted to be locked in engagement with said shank at any desired place along the shank by rotation of said locking member on said shank, and clamping means adjustably related to said locking member to clamp the work between the clamping means and the bolt head.

6. In a fastening device, the combination with a bolt member having a head and shank, of a locking member slidable on said shank, said locking member adapted to be locked in engagement with said shank at any desired place along the shank by a partial rotation of said locking member on said shank, and means carried by said locking member adapted to be projected beyond one end thereof to clamp work between said means and the bolt head.

7. In a fastening device, the combination with a bolt member having a threaded shank provided with a longitudinally extending smooth portion, of a hollow locking member adapted to be mounted on said shank and provided interiorly with complementary threaded and smooth portions, whereby said locking member may be slid on said shank and locked in engagement therewith at any desired place by a partial rotation of said locking member on said shank, and a nut threaded on said locking member and adapted to be projected beyond one end thereof.

In testimony whereof I affix my signature.

SAMUEL W. TAYLOR.